(12) United States Patent
Lee et al.

(10) Patent No.: US 11,427,104 B2
(45) Date of Patent: Aug. 30, 2022

(54) METHOD AND APPARATUS FOR CONTROLLING CHARGING OF VEHICLE BATTERY

(71) Applicants: Hyundai Motor Company, Seoul (KR); Kia Motors Corporation, Seoul (KR)

(72) Inventors: Sangkyu Lee, Yongin-si (KR); Young Chan Byun, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 137 days.

(21) Appl. No.: 17/112,997

(22) Filed: Dec. 5, 2020

(65) Prior Publication Data

US 2021/0399560 A1 Dec. 23, 2021

(30) Foreign Application Priority Data

Jun. 17, 2020 (KR) ........................ 10-2020-0073734

(51) Int. Cl.
*B60L 53/66* (2019.01)
*B60L 53/14* (2019.01)
*H02J 7/00* (2006.01)
*B60L 53/24* (2019.01)
*B60L 53/20* (2019.01)

(52) U.S. Cl.
CPC ............. *B60L 53/66* (2019.02); *B60L 53/14* (2019.02); *B60L 53/20* (2019.02); *B60L 53/24* (2019.02); *H02J 7/00034* (2020.01); *H02J 7/00036* (2020.01); *H02J 7/0047* (2013.01); *H02J 7/007182* (2020.01)

(58) Field of Classification Search
CPC .. H02J 7/00034; H02J 7/00036; H02J 7/0047; H02J 7/007182; B60L 53/14; B60L 53/20; B60L 53/24; B60L 53/66
USPC .......................................................... 320/109
See application file for complete search history.

(56) References Cited

U.S. PATENT DOCUMENTS

2010/0289516 A1\* 11/2010 Mitsutani ................ B60L 53/18
324/764.01
2014/0167691 A1\* 6/2014 Kamaga .................. B60L 53/14
320/109

FOREIGN PATENT DOCUMENTS

WO WO-2009035069 A1 \* 3/2009 ............ B60L 15/007

\* cited by examiner

*Primary Examiner* — Richard Isla
*Assistant Examiner* — Manuel Hernandez
(74) *Attorney, Agent, or Firm* — Morgan, Lewis & Bockius LLP

(57) ABSTRACT

An apparatus of controlling charging of a vehicle battery may include a charging device of a vehicle, the charging device configured to generate a boosted voltage higher than a charging voltage of electric vehicle supply equipment provided outside the vehicle and to charge a battery storing power for driving the vehicle, and a vehicle control unit configured to determine whether power line communication transmitting information for charging the battery performed with the electric vehicle supply equipment provided outside the vehicle and providing the charging voltage to the charging device of the vehicle is off while the battery is charged by the boosted voltage.

15 Claims, 2 Drawing Sheets

METHOD AND APPARATUS FOR CONTROLLING CHARGING OF VEHICLE BATTERY

CROSS-REFERENCE TO RELATED APPLICATION

The present application claims priority to Korean Patent Application No. 10-2020-0073734 filed on Jun. 17, 2020, the entire contents of which is incorporated herein for all purposes by this reference.

BACKGROUND OF THE INVENTION

Field of the Invention

The present invention relates to a vehicle, and more particularly, to a method and an apparatus for controlling charging of a vehicle battery.

Description of Related Art

An electric vehicle utilizes a battery pack as a power source, and utilizes a motor which is an electric motor driven by a voltage of the battery pack to generate driving force, and the motor operates as a motor in the case where power is supplied from a battery and operates as a power generator when the vehicle brakes, so that the motor converts regenerative energy generated during braking into electrical energy and supplies the converted electrical energy to the battery pack as charging voltage.

The battery pack mounted to the electric vehicle is generally formed of 25 or more modules which are connected in series, and in the case where a State of charge (SOC) value of the battery pack cannot secure stable driving to a destination after the end of operation or during operation, the battery pack is charged by use of a commercial power source.

An environment-friendly vehicle, such as an Electric Vehicle (EV) or a Plug-In Hybrid Electric Vehicle (PHEV), utilizes Electric Vehicle Supply Equipment (EVSE) provided in a charging station to charge a battery.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method and an apparatus of controlling charging of a vehicle battery, which are configured for preventing fusion of a main relay of a charging device of a vehicle connected to Electric Vehicle Supply Equipment (EVSE) outside the vehicle and overvoltage generated in a capacitor provided in a neutral point of the charging device when Power Line Communication (PLC) between the EVSE outside the vehicle and a vehicle controller is off while a battery of the vehicle is charged with a boosted voltage (for example, 800 V) higher than a charging voltage (for example, 400 V) of the EVSE outside the vehicle (for example, a fast charger).

Various aspects of the present invention are directed to providing a method of controlling charging of a vehicle battery, including: checking, by a vehicle control unit, whether power line communication transmitting information for charging a battery between electric vehicle supply equipment provided outside the vehicle, which provides a charging voltage to a charging device of the vehicle generating a boosted voltage, and the vehicle control unit is off while the battery storing power for driving the vehicle is charged with a boosted voltage higher than the charging voltage of the electric vehicle supply equipment provided outside the vehicle; when the power line communication is off, decreasing, by the vehicle control unit, an input terminal voltage of the charging device of the vehicle output from the electric vehicle supply equipment provided outside the vehicle by use of the charging device of the vehicle providing the boosted voltage; determining, by the vehicle control unit, whether the input terminal voltage of the charging device of the vehicle reaches a voltage at which the electric vehicle supply equipment provided outside the vehicle does not operate; after determining that the input terminal voltage of the charging device of the vehicle reaches the voltage at which the electric vehicle supply equipment does not operate, determining, by the vehicle control unit, whether the electric vehicle supply equipment provided outside the vehicle is off based on a charging current output to the charging device of the vehicle from the electric vehicle supply equipment provided outside the vehicle; and when the electric vehicle supply equipment provided outside the vehicle is off, turning off, by the vehicle control unit, a main relay of the charging device of the vehicle and stopping the charging of the battery.

The vehicle control unit may decrease the input terminal voltage of the charging device of the vehicle output from the electric vehicle supply equipment provided outside the vehicle by use of a driving motor of the charging device of the vehicle and an inverter connected to the main relay and the driving motor and controlling the driving motor.

The vehicle control unit may decrease the input terminal voltage of the charging device of the vehicle output from the electric vehicle supply equipment provided outside the vehicle to 0 by use of a driving motor of the charging device of the vehicle and an inverter connected to the main relay and the driving motor and controlling the driving motor.

The electric vehicle supply equipment provided outside the vehicle may include a fast charger.

When the charging current output to the charging device of the vehicle from the electric vehicle supply equipment provided outside the vehicle is 0, the vehicle control unit may determine that the electric vehicle supply equipment provided outside the vehicle is turned off.

Various aspects of the present invention are directed to providing an apparatus of controlling charging of a vehicle battery, including: a charging device of a vehicle, the charging device configured to generate a boosted voltage higher than a charging voltage of electric vehicle supply equipment provided outside the vehicle and to charge a battery storing power for driving the vehicle; and a vehicle control unit configured to determine whether power line communication transmitting information for charging the battery performed with the electric vehicle supply equipment provided outside the vehicle and providing the charging voltage to the charging device of the vehicle is off while the battery is charged by the boosted voltage, in which when the power line communication is off, the vehicle control unit is configured to decrease an input terminal voltage of the charging device of the vehicle output from the electric vehicle supply equipment provided outside the vehicle by use of the charging device of the vehicle and providing the boosted voltage, the vehicle control unit determines whether the input terminal voltage of the charging device of the vehicle reaches a voltage at which the electric vehicle supply equipment provided outside the vehicle does not operate, after the input terminal voltage of the charging device of the vehicle reaches the voltage at which the electric vehicle supply equipment provided outside the vehicle does not operate, the vehicle control unit determines whether the electric vehicle supply equipment provided outside the vehicle is off based on a charging current output to the charging device of the vehicle from the electric vehicle supply equipment provided outside the vehicle, and when the electric vehicle supply equipment provided outside the vehicle is off, the vehicle control unit turns off a main relay of the charging device and stops the charging of the battery.

The vehicle control unit may decrease the input terminal voltage of the charging device of the vehicle output from the electric vehicle supply equipment provided outside the vehicle by use of a driving motor of the charging device of the vehicle and an inverter connected to the main relay and the driving motor and controlling the driving motor.

The vehicle control unit may decrease the input terminal voltage of the charging device of the vehicle output from the electric vehicle supply equipment provided outside the vehicle to 0 by use of a driving motor of the charging device of the vehicle and an inverter connected to the main relay and the driving motor and controlling the driving motor.

The electric vehicle supply equipment provided outside the vehicle may include a fast charger.

When the charging current output to the charging device of the vehicle from the electric vehicle supply equipment provided outside the vehicle is 0, the vehicle control unit may determine that the electric vehicle supply equipment provided outside the vehicle is turned off.

The method and the apparatus of controlling charging of the vehicle battery according to the exemplary embodiment of the present invention may prevent fusion of a main relay of a charging device of a vehicle connected to electric vehicle supply equipment outside the vehicle and overvoltage generated in a capacitor installed at a neutral point of the charging device when Power Line Communication (PLC) between the electric vehicle supply equipment outside the vehicle and a vehicle control unit is off while the battery of a vehicle is charged with a boosted voltage higher than a charging voltage of the electric vehicle supply equipment outside the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
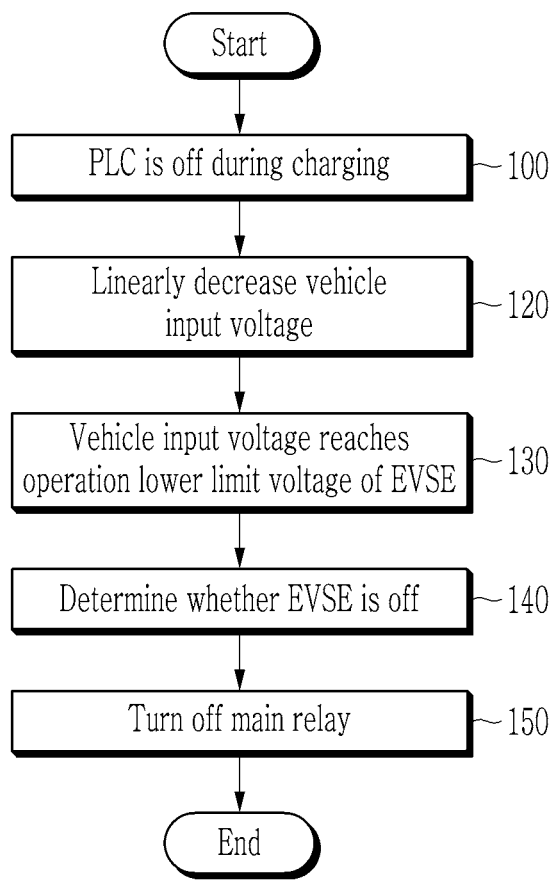
FIG. 1 is a flowchart for describing a method of controlling charging of a vehicle battery according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

To fully understand the present invention and the object achieved by the implementation of the present invention, reference may be made to the accompanying drawings illustrating the exemplary embodiment of the present invention and the contents described in the accompanying drawings.

Hereinafter, the present invention will be described in detail by describing the exemplary embodiment of the present invention with reference to the accompanying drawings. In the following description of the exemplary embodiment of the present invention, a detailed description of known configurations or functions incorporated herein will be omitted when it is judged that the detailed description may make the subject matter of the present invention unclear. Like reference numerals presented in each drawing designate like elements throughout the specification.

The term used in the exemplary embodiment of the present invention is simply used for describing a specific embodiment and does not intend to limit the present invention. A singular expression includes a plural expression unless it is specifically described to the contrary in the context. In the exemplary embodiment, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Throughout the present specification and the claims that follow, when it is described that an element is "coupled" to another element, the element may be "directly coupled" to the other element or "electrically or "mechanically" to the other element through a third element.

All terms used herein including technical or scientific terms have the same meanings as meanings which are generally understood by those skilled in the art unless they are differently defined. Terms defined in generally used dictionary shall be construed that they have meanings matching those in the context of a related art, and shall not be construed in ideal or excessively formal meanings unless they are clearly defined in the present specification.

A high-voltage battery of an electric vehicle according to related technology is charged by fast Electric Vehicle Supply Equipment (EVSE) provided outside the vehicle. The currently used fast EVSE has a voltage range of 400 V. To charge the battery of the vehicle with a voltage of 800 V in the future, a device configured for boosting a voltage of 400 V to a voltage of 800 V is required, and the device may be a multi-charging system using a motor and an inverter. The battery of the vehicle including the multi-charging system may be charged by both the EVSE outputting 400 V and the EVSE outputting 800 V.

The EVSE and the electric vehicle exchange information by use of Power Line Communication (PLC). The exchanged information includes a start and end of the charging of the vehicle and a charging current/voltage.

When the PLC is not established between the EVSE and the electric vehicle during fast charging, the EVSE does not have a signal received from the electric vehicle, so that the amount of current output from the EVSE gradually decreases. Accordingly, a charging off preparation begins in the electric vehicle. When the communication is cut, the electric vehicle measures the charging current of the EVSE, and when the charging current is 5 A or less, the electric vehicle turns off a main relay for protecting a high-voltage battery. However, when the charging current is greater than 5 A, the electric vehicle immediately turns off the relay after five seconds from the measurement time point. Accordingly, there occurs a case where the relay of the vehicle is turned off in the state where the charging current flows. When the relay of the vehicle is turned off in the state where the charging current flows, a fusion failure is generated in the relay. Furthermore, when an electric path is cut by the relay off during the charging, the current output from the EVSE enters a capacitor (a neutral point capacitor) provided at a neutral point of a charging device of the vehicle to generate overvoltage.

Figure 2:
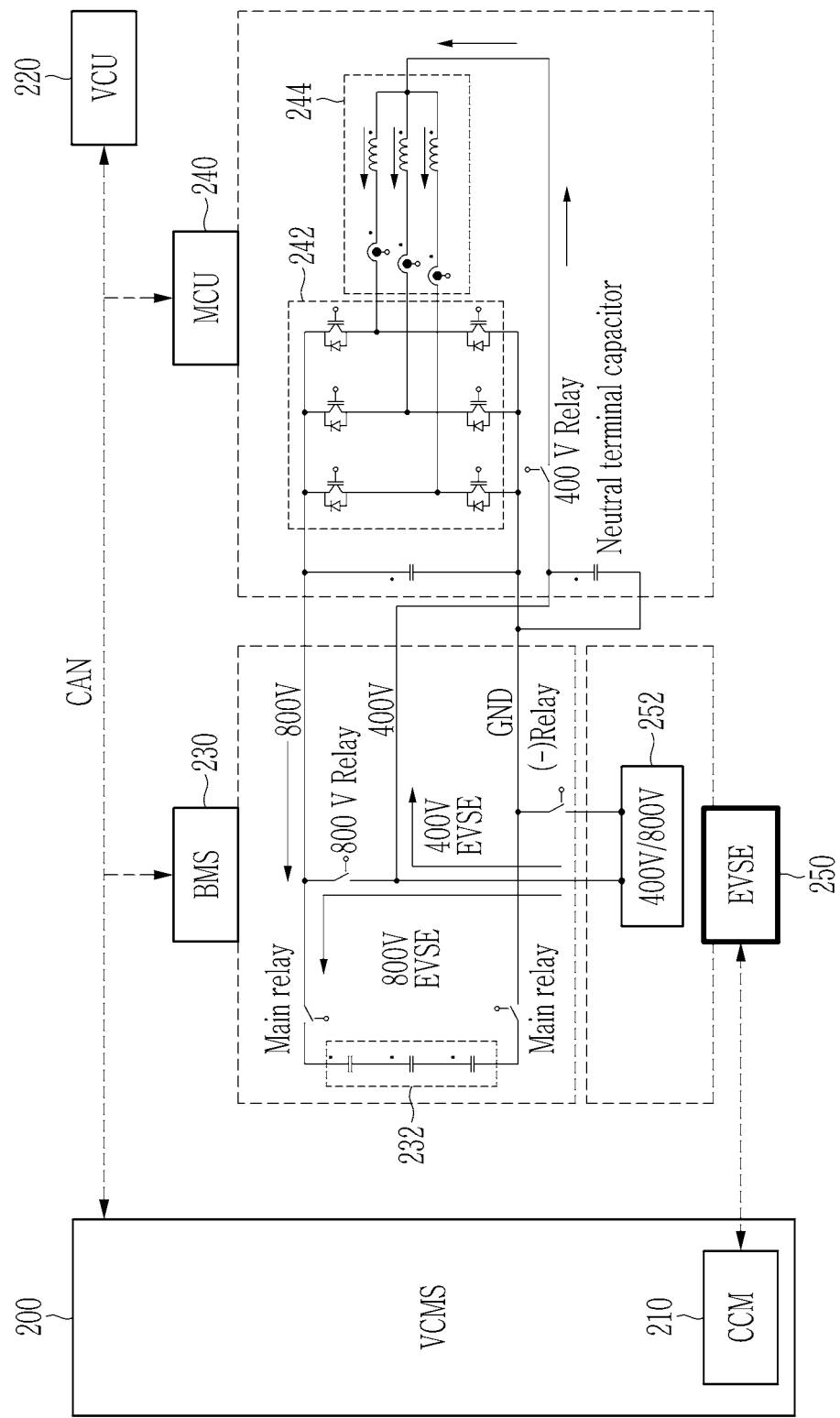
FIG. 2 is a diagram for describing an apparatus of controlling charging of a vehicle battery to which the controlling charging method of the vehicle battery illustrated in FIG. 1 is applied.

FIG. 1 is a flowchart for describing a method of controlling charging of a vehicle battery according to various exemplary embodiments of the present invention. FIG. 2 is a diagram for describing an apparatus of controlling charging of a vehicle battery to which the controlling charging method of the vehicle battery illustrated in FIG. 1 is applied.

Referring to FIG. 1 and FIG. 2, in a checking operation 100, a Vehicle Control Unit (VCU) or a vehicle controller 220 may provide a charging voltage to a charging device of the vehicle generating the boosted voltage, and check (determine) whether PLC that transmits information for charging of a battery between EVSE 250 provided outside the vehicle and the VCU 220 is off while the battery 232, which stores power for driving the vehicle is charged with a boosted voltage (for example, 800 V) higher than a charging voltage (for example, 400 V) of the EVSE provided outside a vehicle (for example, an electric vehicle).

For example, the information for charging the battery may include charging start information, charging end information, a charging current, or a charging voltage. For example, the case where the PLC is off (the PLC is not performed) may include the case where a power line signal is not received in the VCU 220, the case where a time or which a power line signal is not received is equal to or longer than a predetermined time period, or the case where an intensity of the received power line signal is equal to or smaller than a predetermined intensity.

When the power line communication is off, the EVSE 250 may decrease a charging current output to the charging device of the vehicle through output terminals 252 of the EVSE 250. The EVSE 250 like a fast charger performing fast charging may perform a current control for charging the battery 232.

As illustrated in FIG. 2, the vehicle may include a Vehicle Control Modules (VCMs) 200 including a Charging Control Module (CCM) 210 performing PLC with the EVSE 250, the VCU (vehicle controller) 220, a Battery Management System (BMS) 230 including a battery (for example, a high-voltage battery) 232 storing power for driving the vehicle and managing a battery, and a Motor Control Unit (or motor controller) 240 including a driving motor 244 driving the vehicle and a Motor Control Unit (MCU) (or motor controller) 240 controlling the driving motor.

The charging device of the vehicle includes the BMS 230 and the MCU 240, and may be a multi-charger for charging the battery 232 with a boosted voltage or a charging voltage. An operation embodiment of the charging device of the vehicle is included in Korean Patent Application Laid-Open No. 10-2019-0040120 (U.S. Patent Laid-Open Publication No. US 2019/0109462).

The BMS 230 may include the battery 232, a main relay for protecting the battery 232, a first relay (a 800 V relay) for charging the battery with the boosted voltage (for example, 800 V), a second relay (a (−) terminal relay) provided in a ground wire of the charging device of the vehicle, and a third relay (a 400 V) relay for charging the battery with the charging voltage (for example, 400 V). In another exemplary embodiment of the present invention, the battery 232 may be omitted (excluded) in the BMS 230.

The MCU 240 may include an inverter 242, a driving motor 244, a capacitor connected between the input terminals of the inverter 242, and a capacitor (neutral terminal capacitor) provided at a neutral point of the driving motor. The inverter 242 may include a switch, such as an Insulated Gate Bipolar Transistor (IGBT). In another exemplary embodiment of the present invention, the driving motor 244 may be omitted (excluded) in the MCU 240.

The VCU 220 may be connected to the VCMs 200, the BMS 230, and the MCU 240 through Controller Area Network (CAN) communication. The VCU 220 may include the VCMs 200, the BMS 230, and the MCU 240.

The VCU 220 may control the general operation of the vehicle as an Electronic Control Unit (ECU). The VCU 220 may be, for example, one or more microprocessors operating by a program (control logic) or hardware (for example, a microcomputer) including the microprocessor, and the program may include a series of instructions for performing a method of controlling charging of a vehicle battery according to various exemplary embodiments of the present invention. The instruction may be stored in a memory of the vehicle or the VCU 220.

The apparatus of controlling charging of the vehicle battery may include the VCU 220 and the charging device of the vehicle.

According to an operation 120 illustrated in FIG. 1, when the PLC is off, the VCU 220 may decrease an input terminal voltage of the charging device of the vehicle output from the EVSE 250 provided outside the vehicle by use of the charging device of the vehicle providing the boosted voltage. For example, the VCU 220 may linearly decrease the input terminal voltage of the charging device of the vehicle output from the EVSE 250 provided outside the vehicle by use of the driving motor 244 of the charging device of the vehicle providing the boosted voltage and the inverter 242 controlling the driving motor (or the driving motor and the inverter connected to the driving motor) to 0 V.

According to an operation 130, the VCU 220 may determine whether the input terminal voltage of the charging device of the vehicle reaches a voltage (an operation lower-limit voltage of the EVSE) at which the EVSE 250 provided outside the vehicle does not operate. When the input terminal voltage of the charging device of the vehicle decreases, an output voltage through the output terminal 252 of the EVSE 250 provided outside the vehicle may also decrease.

According to an operation 140, after the input terminal voltage of the charging device of the vehicle reaches the voltage at which the EVSE 250 does not operate, the VCU 220 may determine whether the EVSE 250 provided outside the vehicle is off based on the charging current output to the charging device of the vehicle from the EVSE 250 provided outside the vehicle. For example, when the charging current output to the charging device of the vehicle from the EVSE 250 provided outside the vehicle is 0 A, the VCU 220 may determine that the EVSE 250 provided outside the vehicle is off.

According to an operation 150, when the EVSE 250 provided outside the vehicle is off, the VCU 220 may stop (interrupt) the charging of the battery 232 by turning off the main relay of the charging device of the vehicle. Accordingly, it is possible to prevent fusion of the main relay of the charging device of the vehicle connected to the EVSE outside the vehicle and overvoltage generated in the capacitor provided at the neutral point of the charging device.

In another exemplary embodiment of the present invention, when the main relay is off, the 800 V relay and the (−) terminal relay may also be off.

The constituent element, "~ unit", a block, or a module used in the exemplary embodiment of the present invention may be implemented by software, such as a task, class, subroutine, process, object, execution thread, and program performed in a predetermined area of the memory, or hardware, such as Field-Programmable Gate Array (FPGA) or an Application-Specific Integrated Circuit (ASIC), and may also be implemented by a combination of the software and the hardware. The constituent element, "~ unit", or the like may also be included in a computer readable storage medium, and a portion thereof may be distributed in the plurality of computers.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling charging of a vehicle battery, the method comprising:
   checking, by a vehicle control unit, whether power line communication transmitting information for charging the vehicle battery between electric vehicle supply equipment and the vehicle control unit is off while the vehicle battery storing power for driving the vehicle is charged with a boosted voltage higher than a charging voltage of the electric vehicle supply equipment, wherein the electric vehicle supply equipment is provided outside the vehicle and configured to provide the charging voltage to a charging device of the vehicle, the charging device generating the boosted voltage;
   upon determining that the power line communication is off, decreasing, by the vehicle control unit, an input terminal voltage of the charging device of the vehicle output from the electric vehicle supply equipment by use of the charging device of the vehicle;
   determining, by the vehicle control unit, whether the input terminal voltage of the charging device of the vehicle reaches a voltage at which the electric vehicle supply equipment does not operate;
   after determining that the input terminal voltage of the charging device of the vehicle reaches the voltage at which the electric vehicle supply equipment does not operate, determining, by the vehicle control unit, whether the electric vehicle supply equipment is off according to a charging current output to the charging device of the vehicle from the electric vehicle supply equipment; and
   upon determining that the electric vehicle supply equipment is off, turning off, by the vehicle control unit, a main relay of the charging device of the vehicle and stopping the charging of the vehicle battery, wherein the main relay is connected to the vehicle battery.

2. The method of claim 1, wherein the vehicle control unit is configured to decrease the input terminal voltage of the charging device of the vehicle output from the electric vehicle supply equipment by use of a driving motor of the charging device of the vehicle and an inverter, the inverter connected to the main relay and the driving motor and controlling the driving motor.

3. The method of claim 1, wherein the vehicle control unit is configured to decrease the input terminal voltage of the charging device of the vehicle output from the electric vehicle supply equipment to 0 by use of a driving motor of the charging device of the vehicle and an inverter, the inverter connected to the main relay and the driving motor and controlling the driving motor.

4. The method of claim 3, wherein the vehicle control unit is configured to linearly decrease the input terminal voltage to 0.

5. The method of claim 1, wherein the electric vehicle supply equipment includes a fast charger.

6. The method of claim 1, wherein, upon determining that the charging current output to the charging device of the vehicle from the electric vehicle supply equipment is 0, the vehicle control unit is configured to determine that the electric vehicle supply equipment is turned off.

7. The method of claim 1, wherein the power line communication is determined to be off, when a power line signal is not received by the vehicle control unit, the power line signal is not received by the vehicle control unit in a predetermined time period, or an intensity of the power line signal received by the vehicle control unit is equal to or smaller than a predetermined intensity.

8. The method of claim 1, wherein the vehicle control unit includes:
a processor; and
a non-transitory storage medium on which a program for performing the method of claim 1 is recorded and executed by the processor.

9. An apparatus of controlling charging of a vehicle battery, the apparatus including:
a charging device of a vehicle, the charging device configured to generate a boosted voltage higher than a charging voltage of electric vehicle supply equipment and to charge the vehicle battery storing power for driving the vehicle; and
a vehicle control unit including a processor and configured to determine whether power line communication transmitting information for charging the vehicle battery performed with the electric vehicle supply equipment is off while the vehicle battery is charged by the boosted voltage, wherein the electric vehicle supply equipment is provided outside the vehicle and configured to provide the charging voltage to the charging device of the vehicle,
wherein upon determining that the power line communication is off, the vehicle control unit is configured to decrease an input terminal voltage of the charging device of the vehicle output from the electric vehicle supply equipment by use of the charging device of the vehicle,
the vehicle control unit is configured to determine whether the input terminal voltage of the charging device of the vehicle reaches a voltage at which the electric vehicle supply equipment does not operate,
after determining that the input terminal voltage of the charging device of the vehicle reaches the voltage at which the electric vehicle supply equipment does not operate, the vehicle control unit is configured to determine whether the electric vehicle supply equipment is off according to a charging current output to the charging device of the vehicle from the electric vehicle supply equipment, and
upon determining that the electric vehicle supply equipment is off, the vehicle control unit is configured to turn off a main relay of the charging device of the vehicle and to stop the charging of the vehicle battery, wherein the main relay is connected to the vehicle battery.

10. The apparatus of claim 9, wherein the vehicle control unit is configured to decrease the input terminal voltage of the charging device of the vehicle output from the electric vehicle supply equipment by use of a driving motor of the charging device of the vehicle and an inverter, the inverter connected to the main relay and the driving motor and controlling the driving motor.

11. The apparatus of claim 9, wherein the vehicle control unit is configured to decrease the input terminal voltage of the charging device of the vehicle output from the electric vehicle supply equipment to 0 by use of a driving motor of the charging device of the vehicle and an inverter, the inverter connected to the main relay and the driving motor and controlling the driving motor.

12. The apparatus of claim 11, wherein the vehicle control unit is configured to linearly decrease the input terminal voltage of the charging device of the vehicle output from the electric vehicle supply equipment to 0.

13. The apparatus of claim 9, wherein the electric vehicle supply equipment includes a fast charger.

14. The apparatus of claim 9, wherein, upon determining that the charging current output to the charging device of the vehicle from the electric vehicle supply equipment is 0, the vehicle control unit is configured to determine that the electric vehicle supply equipment is turned off.

15. The apparatus of claim 9, wherein the power line communication is determined to be off, when a power line signal is not received by the vehicle control unit, the power line signal is not received by the vehicle control unit in a predetermined time period, or an intensity of the power line signal received by the vehicle control unit is equal to or smaller than a predetermined intensity.

* * * * *